(12) United States Patent
O'Dell et al.

(10) Patent No.: US 6,864,809 B2
(45) Date of Patent: Mar. 8, 2005

(54) KOREAN LANGUAGE PREDICTIVE MECHANISM FOR TEXT ENTRY BY A USER

(75) Inventors: Robert B. O'Dell, Oakland, CA (US); Samuel Yin Lun Pun, Calgary (CA); John M. Conrad, Calgary (CA); Eun-Kyong Paek, South Korea (KR); Changshi Xu, Calgary (CA)

(73) Assignee: Zi Technology Corporation LTD, Hamilton (BM)

( * ) Notice: Subject to any disclaimer, the term of this patent is extended or adjusted under 35 U.S.C. 154(b) by 546 days.

(21) Appl. No.: 10/087,593

(22) Filed: Feb. 28, 2002

(65) Prior Publication Data

US 2003/0179930 A1 Sep. 25, 2003

(51) Int. Cl.[7] .............................................. H03M 11/00
(52) U.S. Cl. .............................. 341/28; 704/3; 341/20; 341/23; 345/168; 345/171; 379/368
(58) Field of Search .......................... 341/20, 23, 28; 345/168, 171; 379/433.07, 368; 400/484; 715/536; 704/3

(56) References Cited

U.S. PATENT DOCUMENTS

| | | | |
|---|---|---|---|
| 5,109,352 A | 4/1992 | O'Dell | 395/150 |
| 5,945,928 A | 8/1999 | Kushler et al. | 341/28 |
| 5,953,541 A | 9/1999 | King et al. | 710/67 |
| 6,011,554 A | 1/2000 | King et al. | 345/352 |
| 6,307,548 B1 | 10/2001 | Flinchem et al. | 345/811 |
| 6,462,678 B1 * | 10/2002 | Ahn | 341/28 |
| 6,788,962 B2 * | 9/2004 | Cha | 455/566 |
| 6,799,303 B2 * | 9/2004 | Blumberg | 715/534 |
| 6,810,374 B2 * | 10/2004 | Kang | 704/2 |

FOREIGN PATENT DOCUMENTS

| | | | | |
|---|---|---|---|---|
| JP | 61-33570 | 2/1986 | | G06F/15/20 |
| JP | 4-207658 | 7/1992 | | H04M/3/42 |
| JP | 11-17825 | 1/1999 | | H04M/11/00 |

* cited by examiner

Primary Examiner—Albert K Wong
(74) Attorney, Agent, or Firm—James D. Ivey; Ivey, Smith and Ramirez

(57) ABSTRACT

Consonant jamos of the Korean language are grouped according to appearance and each group is associated with a respective key of a reduced keypad. Vowel jamos are specified by the user using a number of keys reserved for vowels and each of which represents a respective category of strokes by which the vowel jamo would normally be written.

2 Claims, 10 Drawing Sheets

| Hello. How are you? |  |
|---|---|
| 안녕하세요 | |
| Hangul | Component Jamos |
| 안 | ㅇ ㅏ ㄴ |
| 녕 | ㄴ ㅕ ㅇ |
| 하 | ㅎ ㅏ |
| 세 | ㅅ ㅔ |
| 요 | ㅇ ㅛ |

FIGURE 1

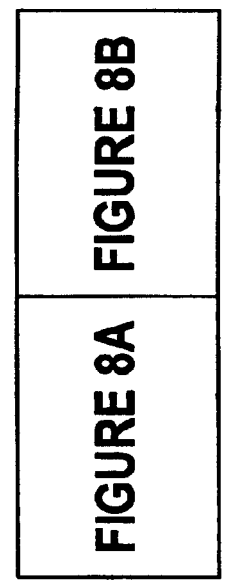
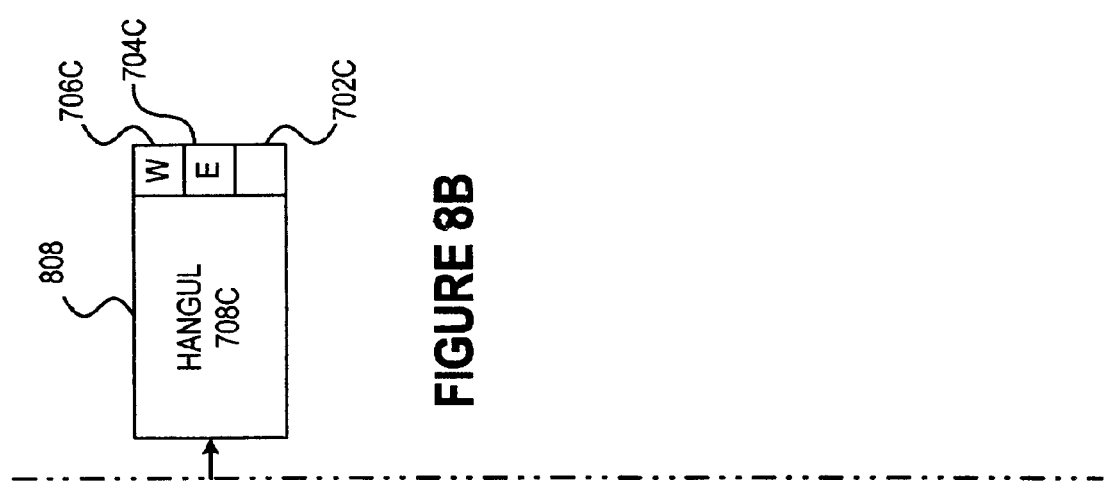
FIGURE 8B
FIGURE 8

KOREAN LANGUAGE PREDICTIVE MECHANISM FOR TEXT ENTRY BY A USER

FIELD OF THE INVENTION

This invention relates to the field of text entry in electronic devices, and more specifically to the entry of Korean characters into an electronic device.

BACKGROUND OF THE INVENTION

The dramatic increase of popularity of the Internet has led to a corresponding dramatic rise in the popularity of textual communications such as e-mail and instant messaging. Increasingly, browsing of the World Wide Web of the Internet and textual communications are being performed using reduced keypads such as those found on mobile telephones.

Use of such reduced keypads for entering text in the Roman alphabet is manageable since there are only 26 letters in the Roman alphabet. Accordingly, generally three (3) or four (4) letters are mapped to each of eight (8) numerical keys as can be seen on the vast majority of telephones sold in the United States. By having so few letters associated with each key, multi-tap systems provide reasonable text entry functionality for users of the Roman alphabet. Briefly, multi-tap systems uses a number of repeated presses of a key to disambiguate multiple letters associated with a single key. For example, pressing the "2" key once represents the letter "a"; pressing the "2" key twice represents the letter "b"; pressing the "2" key thrice represents the letter "c"; and pressing the "2" key four (4) times represents the numeral "2." The number of presses of a particular key is typically delimited with a brief pause. Entering textual data of the Roman alphabet using multi-tap is cumbersome and time-consuming.

By contrast, the written Korean language is composed of symbols called "hanguls" which each represent a syllable of a word. There are roughly 11,000 hanguls in the Korean written language. Mapping all hanguls of the Korean language to a standard mobile telephone keypad would require mapping roughly 1,100 hanguls to each key. Fortunately, some hanguls are used only very infrequently. The KS X 1001:1992 standard includes 2,350 hanguls which generally suffice for the majority of communications in the Korean language. Mapping all hanguls of the KS X 1001:1992 standard to a standard mobile telephone keypad would require mapping more than 200 hanguls to each key. Accoringly, multi-tap is not a reasonable mechanism to enter hanguls using a relatively small keypad.

Direct entry of component parts of hanguls, which are called jamos, is somewhat easier. Jamos are consonant and vowel components of hanguls, and a hangul typically consists of two (2) to four (4) jamos. There are about forty (40) jamos in the Korean language. Mapping all forty (40) jamos to a numerical keypad requires mapping of approximately four (4) jamos to each key. Thus, a four-jamo hangul can require sixteen (16) key presses with appropriately placed pauses to be properly specified using a limited keypad. This is even more cumbersome and time-consuming than entering Roman alphabet text using multi-tap.

It is therefore desirable to provide a system for Korean text input that utilizes relatively few entry keys.

SUMMARY OF THE INVENTION

In accordance with the present invention, consonant jamos of the Korean language are grouped according to appearance and each group is associated with a respective key of a reduced keypad. Vowel jamos are specified by the user using a number of keys reserved for vowels and each of which represents a respective category of strokes by which the vowel jamo would normally be written.

By using 3 keys of the reduced keypad to allow the user to specify strokes of a vowel jamo, a relatively large number of vowel jamos can be specified using only a very few keys. In addition, using the remaining 7 keys to represent consonant jamos allows the user to specify a particular jamo very quickly. If a predictive engine is employed, the user can specify a consonant jamo with a single key-press. Predictive analysis of user input also enables rapid disambiguation of vowel jamos specified by strokes. However, multitap systems work well also. Grouping the consonant jamos by appearance also enables the user to quickly locate a particular consonant jamo within the keypad.

Accordingly, entry of Korean text in accordance with the present invention is particularly convenient.

BRIEF DESCRIPTION OF THE DRAWINGS

FIG. 1 is a table illustrating a written Korean phrase and its linguistic components.

DETAILED DESCRIPTION

In accordance with the present invention, a reduced keypad 200 (FIG. 2) associates a number of keys with stroke categories for user specification of vowel jamos and a number of keys with appearance-based groupings of consonants for user specification. In the illustrative embodiment described herein, keys 1, 2, and 3 of reduced keypad 200 specify vertical, short, and horizontal strokes, respectively, while keys 4, 5, 6, 7, 8, 9, and 0 each represent a respective collection of consonant jamos.

To facilitate understanding and appreciation of the present invention by non-Korean speakers, the fundamentals of the Korean written language are briefly described in the context of the illustrative example of the phrase: "Hello. How are you?" FIG. 1 shows the five (5) hanguls to write out "Hello. How are you?" in Korean and the component jamos of those hanguls. Each hangul represents a syllable and includes a number of component jamos. The relative position of each jamo within each hangul is ordered—typically, jamos are ordered left to right and top to bottom within a hangul. Typically, the second jamo of a hangul is a vowel and the remainder of jamos are consonants.

Figure 2:
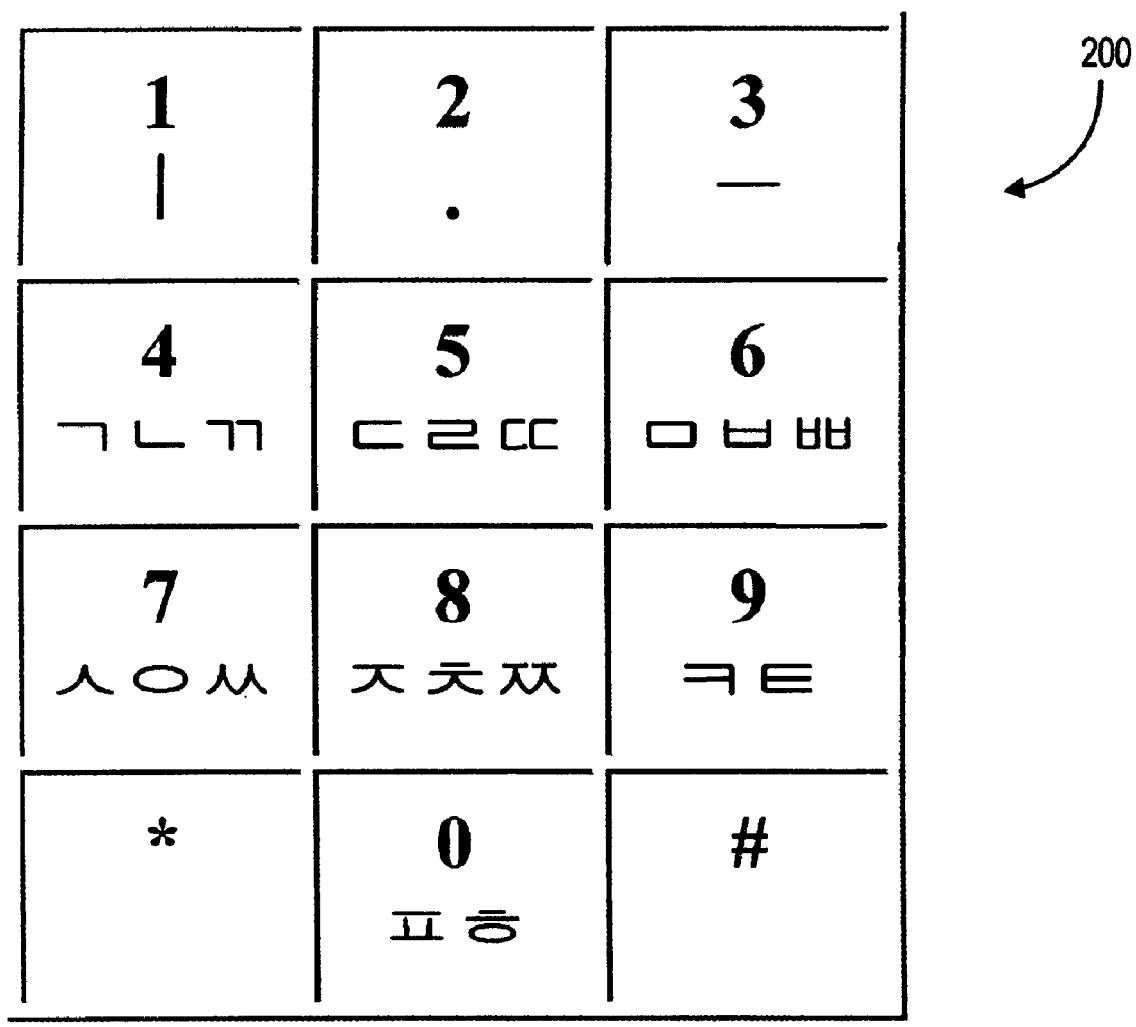
FIG. 2 is a block diagram of a reduced keypad in which jamos of the Korean written language are presented according to the present invention.

To facilitate text entry in the Korean language with a limited keypad, e.g., a numeric keypad, jamos are associated with numeric keys of keypad 200 as shown in FIG. 2. The specific associations between keys and jamos shown in FIG. 2 are illustrative only. Other arrangements of jamos in association with a limited keypad can also be used. The keypad arrangement of FIG. 2 is used in a device 300 (FIG. 3) in which a user enters Korean text using one or more input devices 308 such as keypad 200 (FIG. 2). In this illustrative embodiment, device 300 is a mobile telephone with text messaging capability. However, it is appreciated that text entry predictive assistance described herein is similarly applicable to Korean text entry in a number of other types of device including, without limitation, personal digital assistants (PDAs) and other handheld computers, television set-top boxes, two-way pagers, automatic teller machines (ATMs), automobile navigation systems, video equipment, video editing equipment, portable digital audio players, game controllers, public information kiosks, etc.

Figure 3:
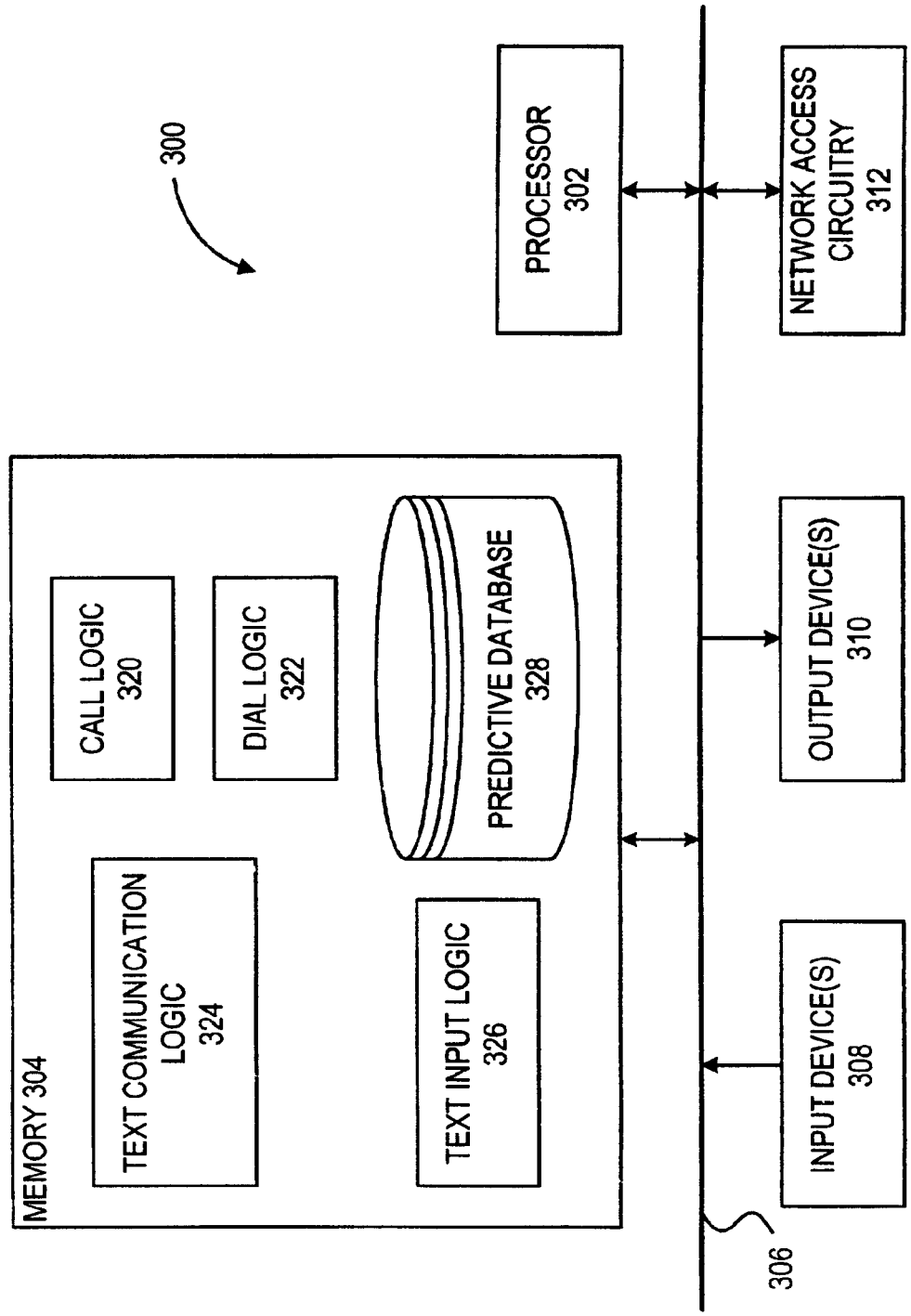
FIG. 3 is a block diagram of an appliance or device which uses the keypad of FIG. 2 in accordance with the present invention.

Device 300 is a shown in diagrammatic form in FIG. 3. Device 300 includes a microprocessor 302 which retrieves data and/or instructions from memory 304 and executes retrieved instructions in a conventional manner.

Microprocessor 302 and memory 304 are connected to one another through an interconnect 306 which is a bus in this illustrative embodiment. Interconnect 306 is also connected to one or more input devices 308, one or more output devices 310, and network access circuitry 312. Input devices 308 include a typical mobile telephone keypad in this illustrative embodiment and a microphone. Output devices 310 include a liquid crystal display (LCD) in this illustrative embodiment in addition to a speaker for playing audio received by device 300 and a second speaker for playing ring signals. Input devices 308 and output devices 310 can also collectively include a conventional headset jack for supporting voice communication through a convention headset. Network access circuitry 312 includes a transceiver and an antenna for conducting data and/or voice communication through a network.

Call logic 320 is a collection of instructions and data which define the behavior of device 300 in communicating through network access circuitry 312 in a conventional manner. Dial logic 322 is a collection of instructions and data which define the behavior of device 300 in establishing communication through network access circuitry 312 in a conventional manner. Text communication logic 324 is a collection of instructions and data which define the behavior of device 300 in sending and receiving text messages through network access circuitry 312 in a conventional manner.

Text input logic 326 is a collection of instructions and data which define the behavior of device 300 in accepting textual data from a user. Such text entered by the user can be sent to another through text communication logic 324 or can be stored as a name of the owner of device 300 or as a textual name to be associated with a stored telephone number for example. As described above, text input logic 326 can be used for endless applications other than text messaging between wireless devices. Predictive database 328 stores data which is used to predict text intended by the user according to pressed keys of input devices 308 in a manner described more completely below.

Keypad 200 (FIG. 2) is organized to provide a particularly convenient interface for entering Korean text. Specifically, keys 1–3 each represent a respective category of stroke for specifying a vowel jamo of the Korean written language while keys 4–0 each represent a respective group of whole consonant jamos. The groups of consonant jamos are organized according to stroke patterns, and thus appearance, of the various consonant jamos.

For example, key 4 of keypad 200 represents jamos which generally include one long horizontal stroke and one long vertical stroke joined at respective ends. In particular, the group of jamos represented by key 4 of keypad 200 includes ㄱ and ㄴ.

Key 5 of keypad 200 represents jamos which generally include a "C" shape. In particular, the group of jamos represented by key 5 of keypad 200 includes ㄷ and ㄹ.

Key 6 of keypad 200 represent jamos which generally include a box shape. In particular, the group of jamos represented by key 6 of keypad 200 includes ㅁ and ㅂ.

Key 8 of keypad 200 represent jamos which generally include an inverted "V" and a top crossbar. In particular, the group of jamos represented by key 8 of keypad 200 includes ㅈ and ㅊ.

Key 9 of keypad 200 represent jamos which generally include a horizontal crossbar at the vertical midpoint through an open-ended rectangular character. In particular, the group of jamos represented by key 9 of keypad 200 includes ㅋ and ㅌ.

The remainder of consonant jamos are distributed among keys 7 and 0 of keypad 200. In particular, the group of jamos represented by key 7 of keypad 200 includes ㅅ and ㅇ, and the group of jamos represented by key 0 includes ㅍ and ㅎ.

Double consonants are associated with the same key of keypad 200 with which the singular version of the same consonant is associated. Specifically, jamos ㄲ, ㄸ, ㅃ, ㅆ, and ㅉ are associated with keys 4, 5, 6, 7, and 8, respectively, of keypad 200.

Keys 1–3 each represent a respective category of stroke in writing a vowel jamo. Key 1 represents generally longer vertical strokes. Key 2 represents generally longer horizontal strokes. And key 3 represents generally short strokes.

Thus, to enter a textual word or phrase, the user presses keys associated with intended consonant jamos according to consonant jamo appearance and, to enter vowel jamos, presses keys 1–3 in the sequence of strokes by which the user would write the vowel jamos with a pen. Such is an intuitive textual interface for those fluent in the Korean written language yet with a considerably reduced keypad.

Figure 4:
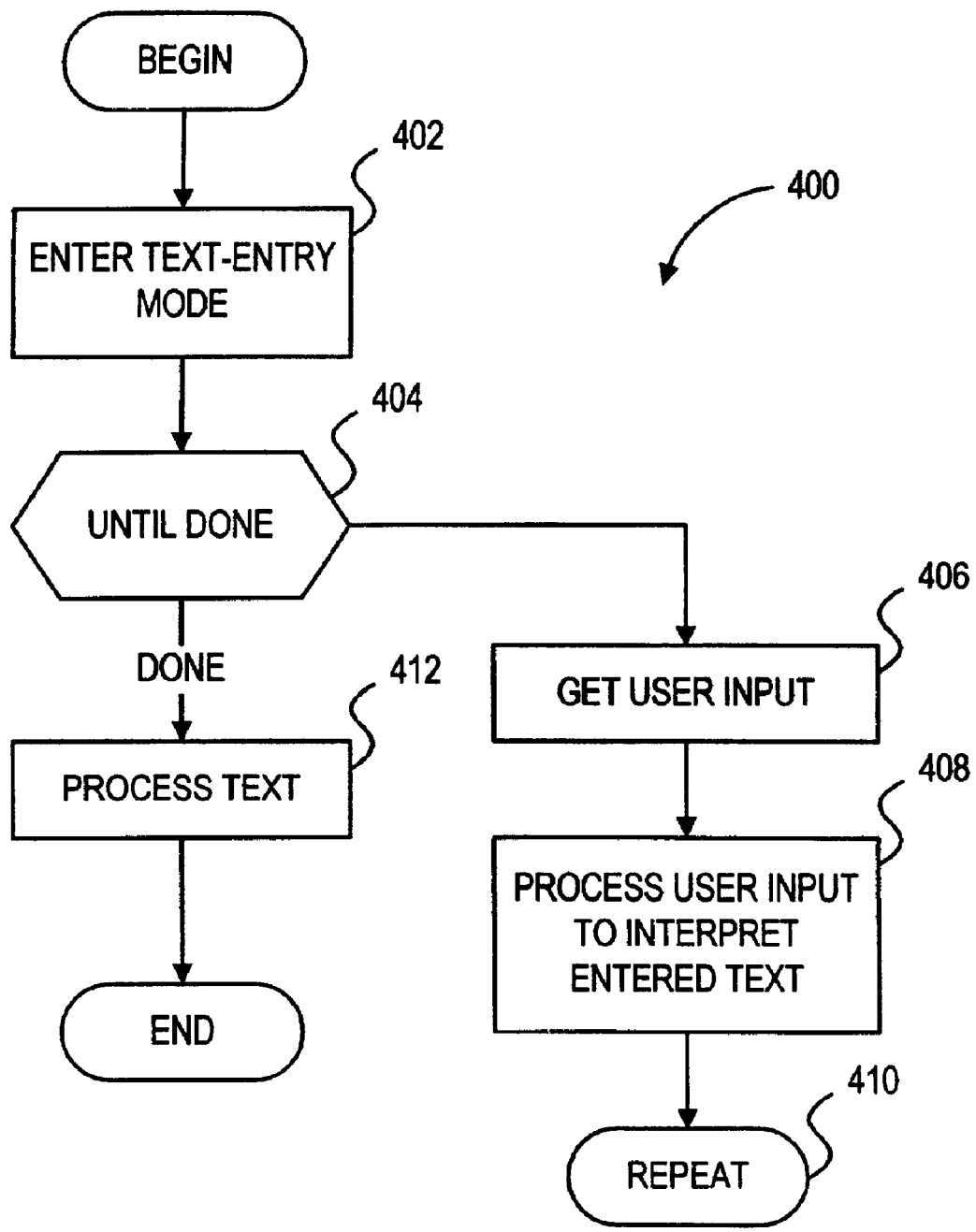
FIG. 4 is a logic flow diagram of the processing of an entered Korean text by the device of FIG. 3.

Logic flow diagram 400 (FIG. 4) illustrates the behavior device 300 (FIG. 3) according to text input logic 326 of this illustrative embodiment. In step 402 (FIG. 4), text input logic 326 (FIG. 3) enters a text entry mode in which user input signals received from input devices 308 are interpreted as text specified by the user. Loop step 404 (FIG. 4) and repeat step 410 define a loop in which text is entered by the user according to steps 406–408 until the user indicates that the message is complete. For each user input signal, processing transfers to step 406.

In step 406, text input logic 326 (FIG. 3) receives a user-generated signal from input devices 308. Processing transfers to step 408 (FIG. 4) in which text input logic 326 interprets the user-generated signal to interpret the text entered by the user. Step 408 is shown in greater detail as logic flow diagram 408 (FIG. 5) which is described below in greater detail.

Signals generated by the user continue to be received and interpreted by text input logic 326 (FIG. 3) in repeated performances of steps 406–408 (FIG. 4) until the user indicates that no more text is to be entered. In step 412, text input logic 326 (FIG. 3) processes the text entered by the user, e.g., by sending the text to text communications logic 324 to send the entered text to an intended recipient using conventional techniques.

Interpretation of user-generated signals in accordance with logic flow diagram 408 begins in step 502 (FIG. 5) in which text input logic 326 (FIG. 3) determines whether the user-general signal represents a menu selection. As described more completely below, a list of hangul candidates is presented to the user as jamos are entered. If the signal most recently generated by the user—which is referred to as the subject signal in the context of logic flow diagram 408—is a menu selection, the subject signal selects a hangul from the list of candidate hanguls and the selected hangul is appended to the text entered by the user thus far. Otherwise, processing transfers from test step 502 (FIG. 5) to step 506.

In step 506, text input logic 326 (FIG. 3) clears the hangul candidate list which is stored in memory 304. The hangul candidate list includes all hanguls which match jamos entered so far by the user. As described more completely below, the candidate hanguls are sorted such that the most likely hanguls intended by the user are presented to the user first. In addition, such likelihood is determined in the context of word continuation in the manner described herein.

In test step 508 (FIG. 5), text input logic 326 (FIG. 3) determines whether the user is currently specifying a first hangul. If the user has not previously entered any hanguls in the currently entered text, the user is entering a first hangul and word continuation hanguls are not considered. Accordingly, if no hanguls have yet been entered in the current text, processing transfers to step 514 (FIG. 5) and steps 510–512 are skipped. Conversely, if other hanguls of the current text have been entered, the user is not entering a first hangul and processing by text input logic 326 (FIG. 3) transfers to steps 510–512 (FIG. 5) which are described below.

Figure 5:
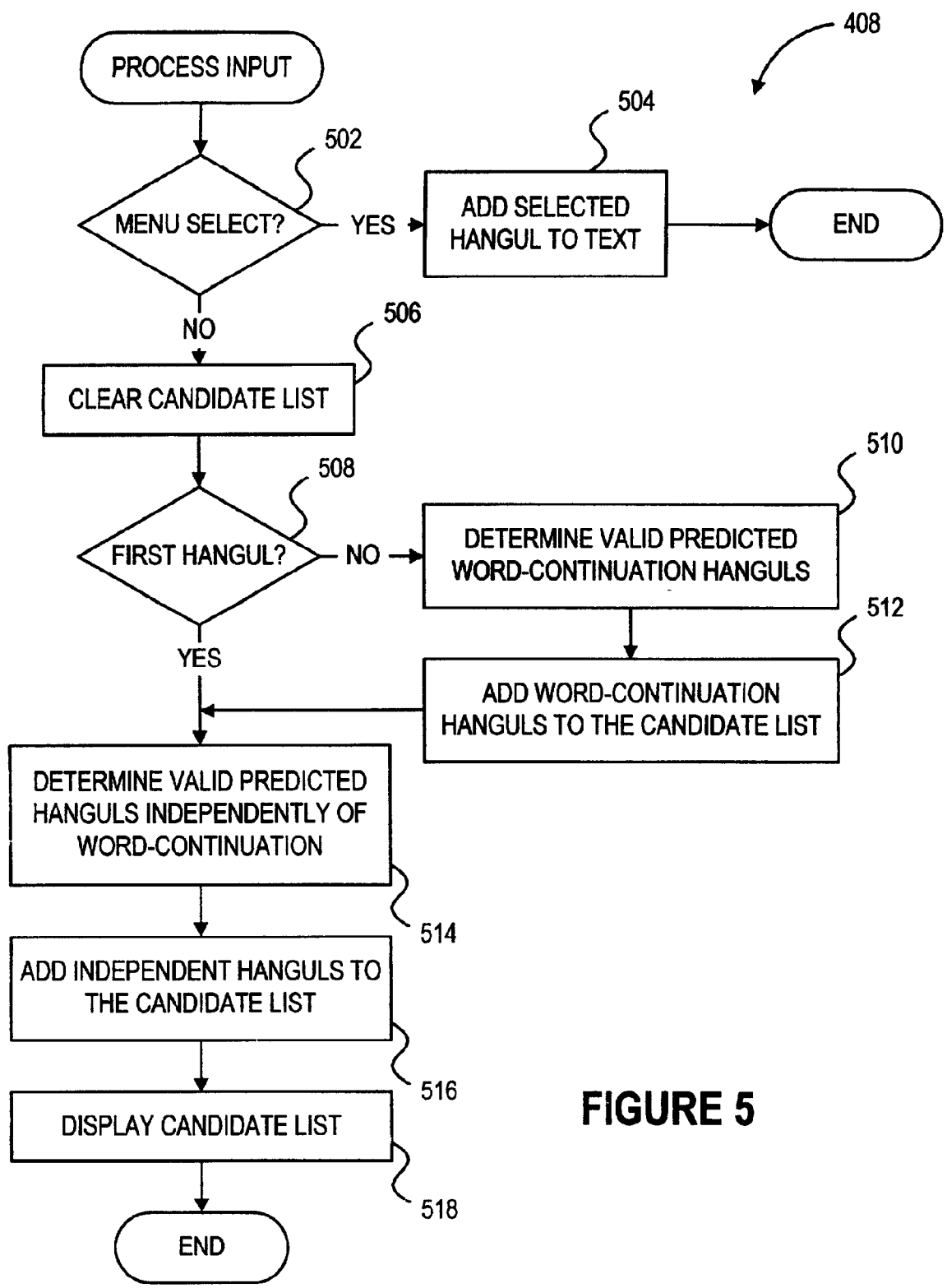
FIG. 5 is a logic flow diagram of the processing of a key press by the user to determine one or more candidate hanguls possibly represented by the key press.

In step 514, text input logic 326 (FIG. 3) predicts which hangul the user intends to enter according to key presses thus far. To do this, text input logic 326 maintains a list of pressed keys since the last hangul selection, e.g., since the last performance of step 504 (FIG. 5). This list is sometimes referred to herein as the key-press list. After such a selection, the key-press list is cleared such that the user can begin to specify the next hangul. In addition, text input logic 326 (FIG. 3) uses predictive database 328 to predict the hangul currently entered by the user.

Figure 6:
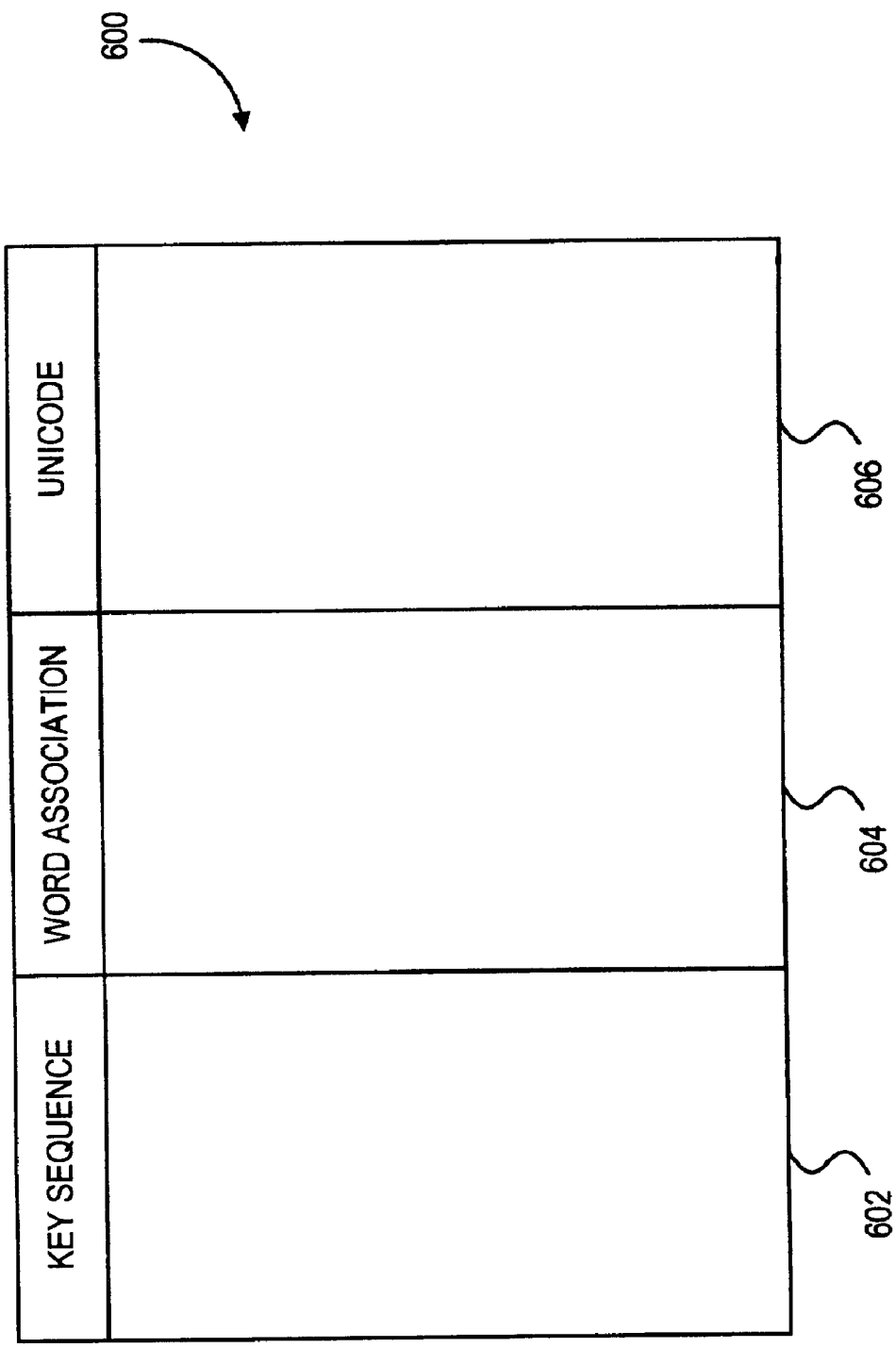
FIG. 6 is a block diagram of a hangul table in which hanguls are represented for processing in accordance with the present invention.
Figure 7:
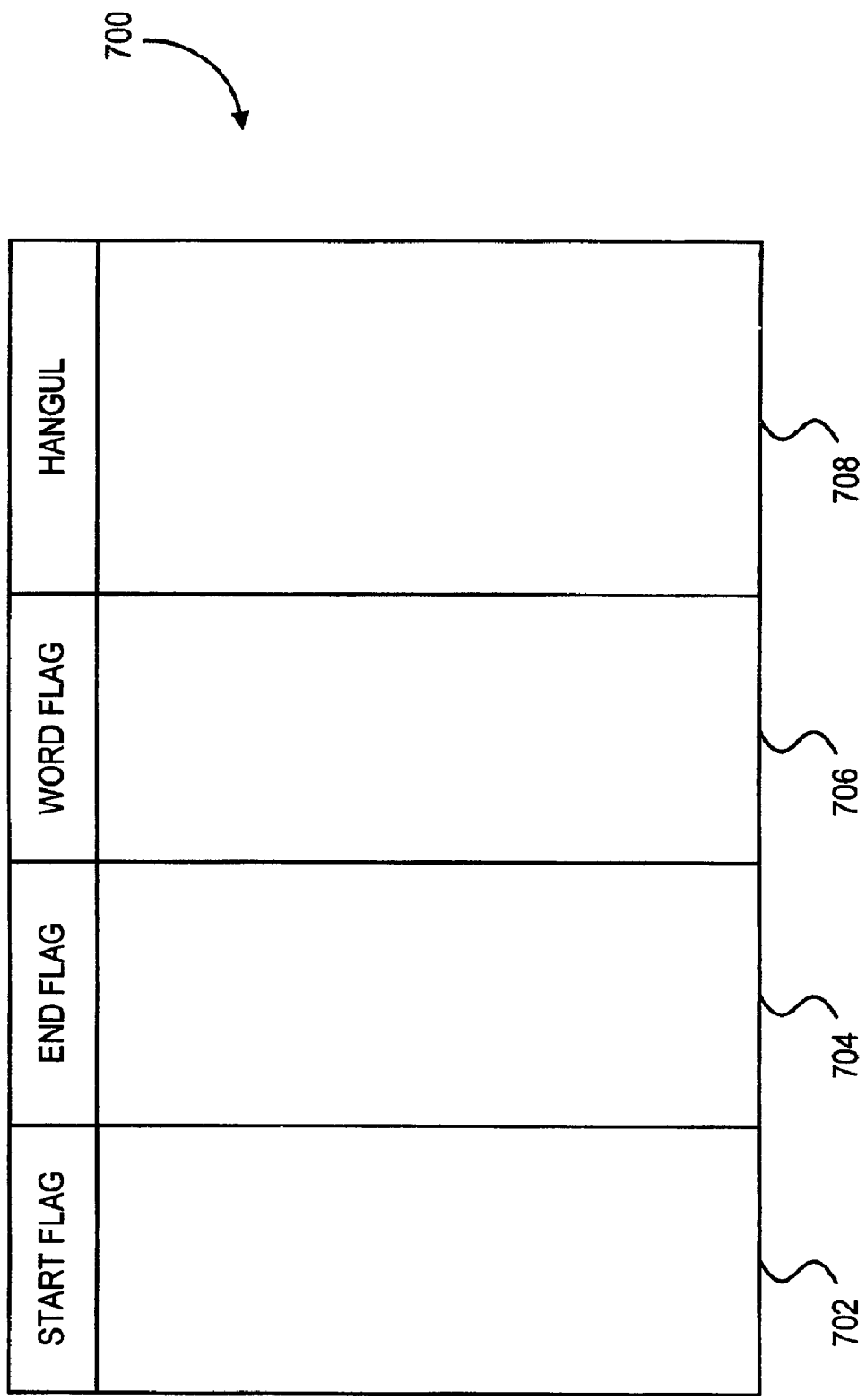
FIG. 7 is a block diagram of a word association table in which relationships between hanguls of multiple-hangul words are represented for determination of word-continuation hanguls in accordance with the present invention.

Predictive database 328 includes a hangul table 600 (FIG. 6) and a word association table 700 (FIG. 7). Word association table 700 is described more completely below. Hangul table 600 (FIG. 6) includes a number of records, each of which represents an individual hangul and includes a key sequence 602, a word association pointer 604, and a unicode representation 606. Key sequence 602 specifies a sequence of key presses which represent the subject hangul. For example, the first hangul of the example of FIG. 1 is entered using keypad 200 (FIG. 2) by pressing keys "7," "1," "2," and "4" in sequence (denoted herein as "7-1-2-4") and that sequence is represented in key sequence 602 of the record representing that hangul.

It should be noted that key sequence 602 is not unique within hangul table 600. In particular, different hanguls can be associated with identical key sequences. Disambiguation of such key sequences is accomplished by user selection from a list of hangul candidates aided by hangul prediction in accordance with the present invention. In an alternative embodiment, each of the jamos associated with a particular key of keypad 200 is unambiguously specified by a number of consecutive presses of the key in a multi-tap fashion. For example, the user can specify the jamo ㄱ by pressing the "4" key once, can specify the jamo ㄴ by pressing the "4" key twice, and can specify the jamo ㄲ by pressing the "4" key three times. In this alternative embodiment, key sequence 602 is still not unique since specification of vowel jamos is still by stroke category.

Word association pointer 604 is a pointer into word association table 700 (FIG. 7) for records specifying which words begin with the subject hangul. Word association table 700 is described more completely below.

Unicode representation 606 (FIG. 6) specifies the Unicode number which represents the subject hangul. Unicode numbers are standard and are analogous to the ASCII character set by which most Western alphabets are represented in computers.

The records of hangul table 600 are sorted according to frequency of use. To sort the records of hangul table 600, the relative frequency of various hanguls of the Korean language is determined. Relative frequency of hanguls of the Korean language can be determined in various ways including statistical analysis of ordinary publications such as books, magazines, and newpapers.

Small hand-held devices such as mobile telephones have a fairly specialized purpose. Accordingly, a relatively small vocabulary—e.g., about 2,000 characters—is typically sufficient for nearly all uses on such a device. Accordingly, in this illustrative embodiment, device 300 (FIG. 3) includes the approximately 2,350 hanguls of the KS X 1001:1992 standard.

The typical specialized purpose of such small hand-held devices is generally not one of the types of writings typically analyzed for hangul-use frequency. Accordingly, in an alternative embodiment, Internet communications is analyzed for frequency of character usage instead of, or to be combined with, frequency of usage determined by conventional analysis. Frequency of use in Internet communications can be analyzed by searching as much content of the World Wide Web as possible and analyzing that content. In addition, communication such as e-mail and text messages of wireless telephones can be tabulated. However, care should be taken not to retain persistent copies of messages for privacy reasons. Instead, running totals of various hanguls can be maintained as messages pass through on their way to intended recipients to determine relative frequencies of those hanguls. This latter analytical mechanism has the advantage of picking up new, technical, and slang terms that are commonly used by precisely the type of user for which the text input mechanism is intended.

In step 514 (FIG. 5), text input logic 326 (FIG. 3) selects the records of hangul table 600 (FIG. 6) which match the keys pressed thus far by the user and adds the hanguls of those records to the hangul candidate list. For example, if the user presses the "7" key of keypad 200, text input logic 326 collects all hanguls of hangul table 600 whose key sequence 602 begins with the "7" key. The user can then select from the hangul candidate list as described above with respect to steps 502–504 or can press a key associated with the next jamo of the intended hangul to further specify the intended hangul. In the latter case, step 514 is performed a second time. In this subsequent performance of step 514 in which the user has pressed the "1" key subsequent to pressing the "7" key as described above, text input logic 326 (FIG. 3) collects all hanguls of hangul table 600 (FIG. 6) whose key sequence 602 begins with the sub-sequence 7-1 (i.e., the "7" key followed immediately by the "1" key). As additional keys are pressed, the number of hanguls which match the key sequence is reduced, as does the list of valid hanguls collected in step 514 (FIG. 5).

The hanguls collected in step 514 are added to the hangul candidate list in step 516 by text input logic 326 (FIG. 3) in the order found in hangul table 600 (FIG. 6). Since the records of hangul table 600 are sorted by frequency of usage of each subject hangul, the hangul candidate list is similarly sorted.

In step 518 (FIG. 5), text input logic 326 (FIG. 3) displays the hangul candidate list to the user such that the user can select the intended hangul from the list. Since the list is sorted according to frequency of usage, the intended hangul is relatively frequently at or near the top of the displayed hangul candidate list. If the intended hangul is not listed near the top, the user can continue to press keys associated with component jamos of the intended hangul until the hangul candidate list is sufficiently small that the intended hangul is near the top or traversal of the entire list is relatively easy.

Eventually, in a subsequent performances of the steps of logic flow diagram 408 (FIG. 5), the user-generated signal represents a menu selection and the intended hangul is appended to the currently-constructed text message in step 504 as described above. Once that happens, the user is no longer entering a first hangul and processing transfers from test step 508 to step 510 in subsequent performances of the steps of logic flow diagram 408.

In step 510, text input logic 326 (FIG. 3) determines which hanguls can be continuations of a word which begins with previously entered hanguls. In step 512 (FIG. 5), text input logic 326 (FIG. 3) appends those word-continuation hanguls to the hangul candidate list. Since step 512 (FIG. 5) is performed prior to step 516, word-continuation hanguls are presented before non-word-continuation hanguls in the hangul candidate list.

To determine which hanguls can be continuations of a word which begins with previously entered hanguls, text input logic 326 (FIG. 3) refers to word association table 700 (FIG. 7) which is part of predictive database 328 (FIG. 3). Word association table 700 (FIG. 7) specifies word relationships of hanguls represented in hangul table 600 (FIG. 6) and includes a number of records, each of which includes a start flag 702 (FIG. 7), an end flag 704, a word flag 706, and a hangul pointer 708. Start flag 702 indicates whether the current record of word association table 700 is a first record for a subject hangul of hangul table 600 (FIG. 6). End flag 704 indicates whether the current record is the last record of a particular string of records within word association table 700. Word flag 706 indicates whether the current record is the end of a valid word in the Korean language. Hangul pointer 708 is a pointer into hangul table 600 (FIG. 6) to identify the particular hangul represented by the current record of word association table 700 (FIG. 7).

The following example illustrates the inter-relationships between the various flags of word association table 700. Consider that text entry logic 326 (FIG. 3) is looking for word-continuation hanguls for the hangul "대." Word association table 700 would include—among other records—records for the words "대가," "대가극," and "대가리" (respectively, (i) great master, authority or cost, price; (ii) a grand opera; and (iii) top, point, head). Accordingly, word association table 700, in this illustrative example, would include a record representing the hangul "가" to show that the hangul "가" follows the hangul "대" in a valid word. This record would include a hangul pointer 708 pointing to a record in hangul table 600 (FIG. 6) which represents the hangul "가." This record would also include a word flag 706 which indicates that this record represents a valid word since "대가" is a valid Korean word.

End flag 704 of this record would indicate that this record does not represent the end of the current string since valid Korean words which begin with "대가" exist. In particular, by indicating that this record is not the end of the current string, end flag 704 indicates that the immediately subsequent record of word association table 700 continues the current string. Start flag 702 indicates this record is the start of word associations for the hangul "대" if no other strings precede the current one in word association table 700 or indicates that this record is not the start otherwise.

Continuing in this illustrative example, the immediately subsequent record of word association table 700 represents the hangul "극" as indicated by hangul pointer 708. Word flag 706 of this record indicates that this record ends a valid word since "대가극" is a valid word in the Korean language. End flag 704 indicates that this record is the end of the current string since word association table 700 does not represent any words which begin with "대가극" and include subsequent hanguls. Start flag 702 indicates that this record is not the first record for the hangul "대".

The preceding example illustrates that use of word flag 706 allows representation of multiple words in a single string of records. In particular, the word association table of this illustrative example stores one string of records which simultaneously represents "대" (having many meanings including largeness, stalk/cane, time/period/age, party/corps, stand/rack/podium, for example), "대가," and "대가극." Such a technique saves valuable and scarce storage resources in portable devices such as mobile telephones.

In this illustrative embodiment, such efficiency is achieved only when one word is wholly contained within another word at the beginning of that word. For example, "대가" is wholly contained within, and begins, "대가극." However, "대가극" is not wholly contained within "대가족" and the two words would therefore be represented by distinct record strings within word association table 700.

Upon processing of a record whose end flag 704 indicates that the record is the last of a string, the next record of word association table 700 is processed as a new string. For example, if the record representing the hangul "극" in the preceding example is followed by a record representing the hangul "각," the subsequent record is interpreted by text entry logic 326 (FIG. 3) as representing words which begin with "대각" (which means "diagonal" and which begins several other Korean words) rather than continuing with words beginning with "대가극각" which is not a valid Korean word as represented within word association table 700 (FIG. 7).

Text input logic 326 (FIG. 3) continues to traverse records of word association table 700 (FIG. 7) in a sequential manner until text input logic 326 (FIG. 3) retrieves a record whose start flag 702 indicates that the retrieved record is the first record of word associations for a particular hangul. When a record whose start flag 702 so indicates, all records of word association table 700 for the subject hangul have been retrieved and processed and processing of word association table 700 for the subject hangul is complete.

The records of word association table 700 are sorted. In particular, word association records for a particular hangul are sorted. Since each collection of word association records associated with a particular subject hangul are identified with a word association pointer 604 (FIG. 6) in the record of the subject hangul, the individual collections of word association records corresponding to individual subject hanguls can be stored in generally any order. However, the records within each collection are sorted.

Figure 8A:
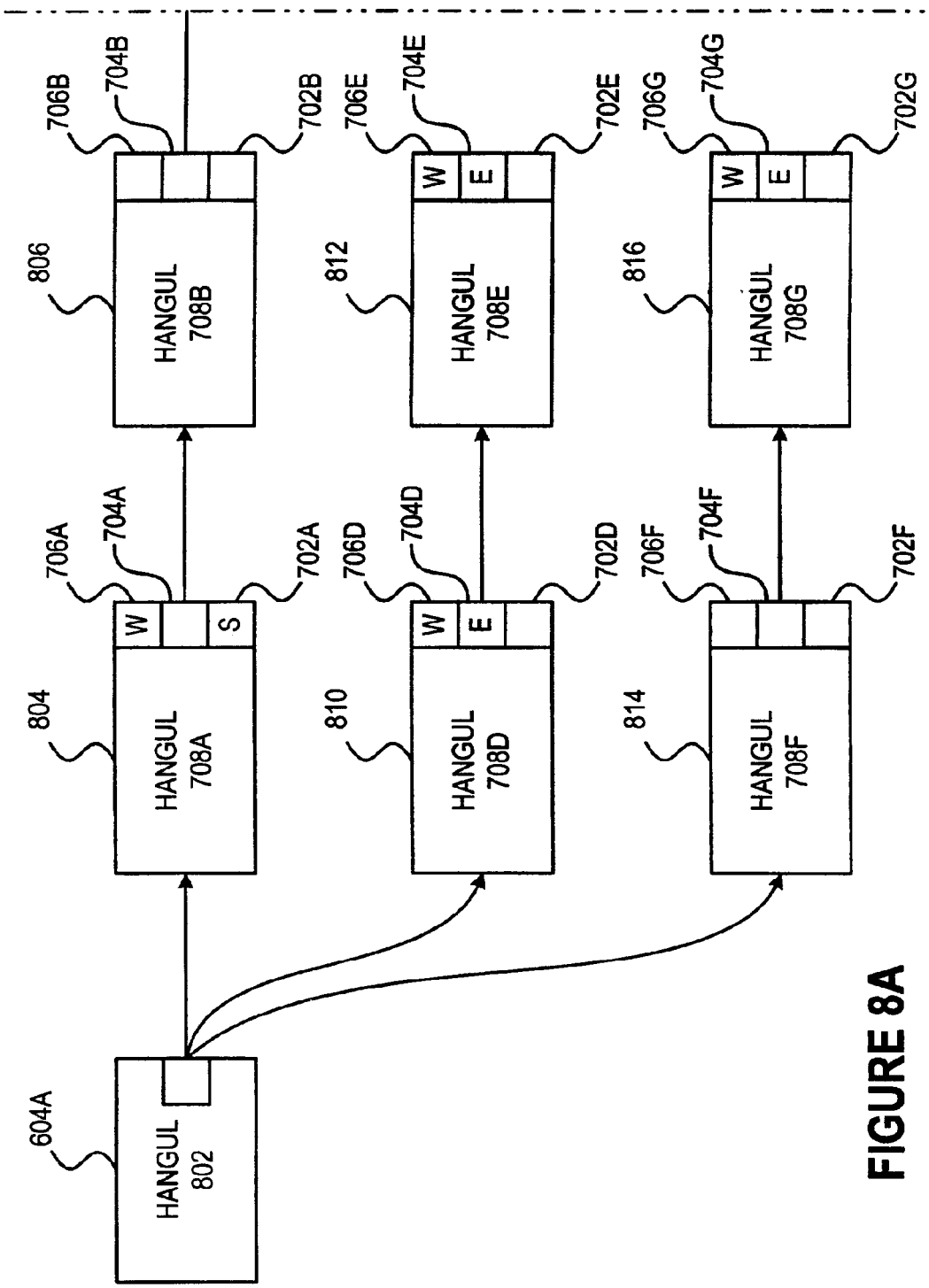
FIG. 8 is a block diagram of an alternative illustration of the word association table of FIG. 7 to illustrate relative ordering within the word association table of FIG. 7 in an illustrative embodiment.

The word association records associated with a subject hangul are sorted according to frequency of usage of individual hanguls within words. FIG. 8 is illustrative. Hangul 802 is a hangul record of hangul table 600 (FIG. 6). Hangul 802 includes a word association pointer 604A into word association table 700 to word association record 804 which includes a hangul pointer 708A, a word flag 706A, an end flag 704A, and a start flag 702A which in turn are analogous to hangul pointer 708 (FIG. 7), word flag 706, end flag 704, and start flag 702, respectively, as described above.

As described above, multiple words can be represented by a single sequence of word association records. As shown in FIG. 8, word flags 706A and 706C show that valid words represented by (i) hanguls 802 and 708A and (ii) hanguls 802, 708A, 708B, and 708C. Thus, sorting by word frequency requires resolution of an ambiguity as to which word frequency should be association with the sequence of word association records 804–808 which represent both words (i) and (ii) described above. Accordingly, in this illustrative embodiment, sequences of word association records are sorted according to frequency of hangul usage.

FIG. 8 shows three (3) sequences of word association records corresponding to hangul record 802 of hangul table 600. In the context of FIG. 8, the hangul represented by hangul record 802 is referred to as the subject hangul. The three sequences include (i) word association records 804–808, (ii) word association records 810–812, and (iii) word association records 814–816. To sort these sequences within word association table 700, the frequency of hangul 708A of word association record 804 versus the frequency of hangul 708D of word association record 810 is determined in the context of hanguls immediately following the subject hangul in words which begin with the subject hangul. It should be appreciated that the frequency of word usage rather than frequency of usage in distinct words. In this illustrative example, hangul 708A is used more frequently in words beginning with the subject hangul than is hangul 708D. Accordingly, the sequence including word association record 804 appears within word association table 700 before the sequence including word association record 810. To further illustrate the context of frequency used for sorting, it is possible that hangul 708D appears immediately following the subject hangul in more distinct words than does hangul 708A. However, hangul 708A appears immediately following the subject hangul in written text. In other words, the words in which hangul 708A immediately follows the subject hangul are more frequently used in written Korean than do words in which hangul 708D immediately follows the subject hangul.

Further in this illustrative example, hanguls 708D and 708F are the same—in other words, the same hangul is identified by hangul pointers 708D and 708F. Accordingly, the relative frequencies of usage of the hanguls represented by hangul pointers 708E and 708G determine the relative position within word association table 700 of sequences which include word association records 812 and 816.

As described above, text input logic 326 (FIG. 3) collects word continuation hanguls and stores them in the list of candidate hanguls. In the context of the illustrative example of FIG. 8, text input logic 326 (FIG. 3) collects hanguls represented by word association records 804 (FIG. 8), 810, and 814. In this illustrative embodiment, text input logic 326 (FIG. 3) predicts only the next hangul and not the entire word. Accordingly, hanguls represented by word association records 806, 808, 812, and 816 are not collected by text input logic 326. In an alternative embodiment, text input logic 326 predicts full words in the Korean language and collects all hanguls represented in FIG. 8 to predict a full word entered by the user.

Returning to the illustrative embodiment in which only the next hangul is predicted, text input logic 326 removes any duplicate hanguls from the list of candidate hanguls. For example, word association records 810 and 814 represent the same hangul as following the hangul of hangul record 802 in different valid words. Accordingly, text input logic 326 includes the hangul of word association records 810 and 814 only once in the list of candidate hanguls.

Once the word-continuation hanguls are added to the list of hangul candidates in step 512, independent hanguls are appended to the list in step 516 as described above such that word-continuation hanguls are given higher priority when predicting the particular hangul currently being specified by the user. Accordingly, the user is free to choose a hangul which does not follow from the most recently entered hangul in valid Korean words. The user is therefore not limited to a predetermined list of recognized Korean words. Such enables the user to formulate proper names and a form of individualized shorthand recognized by associates of the user. However, text input logic 326 places priority of recognized Korean words over such unconventional text usage.

Figure 9:
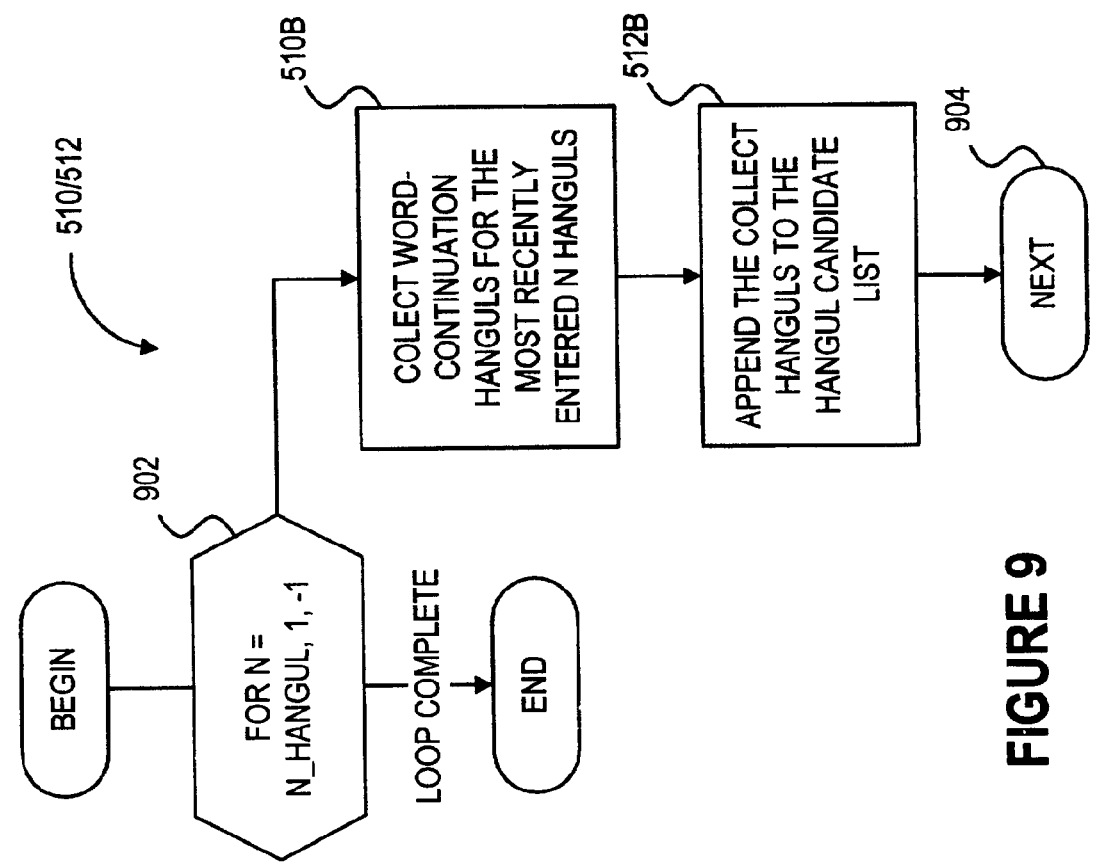
FIG. 9 is a logic flow diagram illustrating word continuation analysis when more than one hangul has already been specified by the user.

In this description of step 510, only one hangul was previously specified by the user. In a subsequent performance of step 510, two hanguls have been specified by the user. Such raises several possibilities regarding the text message currently composed by the user. First, the two previously specified hanguls can be the first two hanguls of a valid Korean word currently being entered by the user. Second, the most recently specified hangul is the first hangul of a valid Korean word currently being entered by the user. Third, the user is not entering a Korean word which includes either of the previously specified hanguls. Accordingly, three types of hanguls are collected into the hangul candidate list: (i) hanguls which immediately follow the two previously entered hanguls in valid Korean words; (ii) hanguls which immediately follow the most recently entered hangul in valid Korean words; and (iii) independent hanguls, i.e., hanguls which match key pressed made by the user without regard to continuation of valid Korean words. The collecting of hanguls according to each possibility is illustrated by logic flow diagram 510/512 (FIG. 9) which corresponds to steps 510–512 of logic flow diagram 500 (FIG. 5).

Loop step 902 (FIG. 9) and next step 904 define a loop in which the most recently entered N hanguls are processed according to steps 510B and 512B where N begins at the total number of entered hanguls, decrements for each iteration of the loop of steps 902–904, and ends at one (1). For example, if four (4) hanguls have been entered, there are four iterations of the loop of steps 902–904 and N has the following values in order: four, three, two, and one.

In step 510B, text input logic 326 (FIG. 3) collects word-continuation hanguls for the most recently entered N hanguls in the manner described above with respect to step 510 (FIG. 5). In step 512B (FIG. 9), text input logic 326 (FIG. 3) appends the hanguls collected in step 510B to the list of candidate hanguls in the manner described above with respect to step 512. After step 512B (FIG. 9), processing transfers through next step 904 to loop step 902 in which steps 510B and 512B are repeated with the next value of N.

Figure 10:
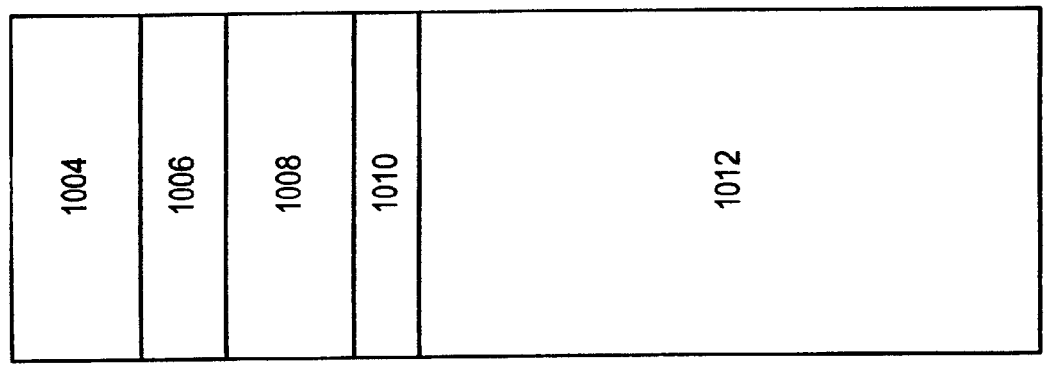
FIG. 10 is a block diagram of a hangul candidate list resulting from processing according to FIG. 9.

In the illustrative embodiment in which the user has previously entered four (4) hanguls, the resulting hangul candidate list 1002 is shown in FIG. 10. Section 1004 of hangul candidate list 1002 includes hanguls which immediately follow all four (4) hanguls previously entered by the user in sequence in valid Korean words. Section 1006 of hangul candidate list 1002 includes hanguls which immediately follow the three (3) hanguls most recently entered by the user in sequence in valid Korean words. Section 1008 of hangul candidate list 1002 includes hanguls which immediately follow the two (2) hanguls most recently entered by the user in sequence in valid Korean words. Section 1010 of hangul candidate list 1002 includes hanguls which immediately follow the one (1) hangul most recently entered by the user in sequence in valid Korean words. Section 1012 of hangul candidate list 1002 includes hanguls irrespective of hanguls previously entered by the user.

It should be appreciated that all hanguls in hangul candidate list 1002 match the key press sequence currently entered by the user as described above more completely. In addition, it should be appreciated that any of sections 1004–1010 can be empty. If section 1012 is empty, the user's key press section does not match any hanguls.

The overall effect of hangul candidate list 1002 in the order shown is that text input logic 326 (FIG. 3) gives greater priority to longer words entered by the user. In particular, the assumption is that the user is entering valid Korean words. Accordingly, if the user has entered a number of hanguls, text input logic 326 gives the highest priority to hanguls which follow the previously entered hanguls in valid Korean words. Next highest priority is given to hanguls which follow the next highest number of previously entered hanguls, and so on. Thus, knowledge of valid Korean words is used to more accurately predict entered hanguls as the user pressed keys to identify a hangul.

The above description is illustrative only and is not limiting. For example, while text messaging using a wireless telephone is described as an illustrative embodiment, it is appreciated that text entry in the manner described above is equally applicable to many other types of text entry. Wireless telephones use text entry for purposes other than messaging such as storing a name of the wireless telephone's owner and associating textual names or descriptions with stored telephone numbers. In addition, devices other than wireless telephones can be used for text messaging, such as two-way pagers and personal wireless e-mail devices. Personal Digital Assistants (PDAs) and compact personal information managers (PIMs) can utilize text entry in the manner described here to enter contact information and generally any type of data. Entertainment equipment such as DVD players, VCRs, etc. can use text entry in the manner described above for on-screen programming or in video games to enter names of high scoring players. Video cameras with little more than a remote control with a numeric keypad can be used to enter text for textual overlays over recorded video. Japanese text entry in the manner described above can even be used for word processing or any data entry in a full-sized, fully-functional computer system.

Therefore, this description is merely illustrative, and the present invention is defined solely by the claims which follow and their full range of equivalents.

What is claimed is:

1. A method for generating Korean text in response to signals generated by a user, the method comprising:

receiving signals generated by the user which specify one or more collections, each of which includes one or more consonant jamos wherein the collections are organized according to appearance of consonant jamos;

receiving signals generated by the user which specify one or more stroke types by which one or more vowel jamos are identified;

determining that one or more predicted hanguls according to a sequence of the signals generated by the user; and presenting the one or more predicted hanguls to the user for selection.

2. The method of claim 1 wherein determining comprises:

determining one or more word continuation hanguls according to the sequence and according to one or more accepted hanguls which have been previously specified by the user.

* * * * *